US010785056B1

(12) United States Patent
Mathur et al.

(10) Patent No.: US 10,785,056 B1
(45) Date of Patent: Sep. 22, 2020

(54) SHARING A SUBNET OF A LOGICALLY ISOLATED NETWORK BETWEEN CLIENT ACCOUNTS OF A PROVIDER NETWORK

(71) Applicant: Amazon Technologies, Inc., Seattle, WA (US)

(72) Inventors: Piyush Mathur, Redmond, WA (US); David Lennon, Reston, VA (US); Daniel Fuller, Herndon, VA (US); Steven Betten, Herndon, VA (US); Andrew Dickinson, Seattle, WA (US); Mahmoud Abuelela, Herndon, VA (US); Michael Borgerding, Herndon, VA (US); Rebecca Weiss, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/194,120

(22) Filed: Nov. 16, 2018

(51) Int. Cl.
| H04L 12/46 | (2006.01) |
| H04L 12/755 | (2013.01) |
| H04L 12/713 | (2013.01) |
| H04L 29/06 | (2006.01) |
| G06F 9/455 | (2018.01) |

(52) U.S. Cl.
CPC ...... *H04L 12/4675* (2013.01); *G06F 9/45558* (2013.01); *H04L 45/021* (2013.01); *H04L 45/586* (2013.01); *H04L 63/0272* (2013.01); *H04L 63/10* (2013.01); *G06F 2009/45587* (2013.01)

(58) Field of Classification Search
CPC ............ H04L 12/4675; H04L 63/0272; H04L 45/586; G06F 9/45558
See application file for complete search history.

(56) References Cited

U.S. PATENT DOCUMENTS

| 7,096,281 B2 | 8/2006 | Brabson et al. |
| 7,174,376 B1 | 2/2007 | Daruwalla |
| 9,172,621 B1 * | 10/2015 | Dippenaar ............. H04L 41/18 |
| 9,306,949 B1 * | 4/2016 | Richard ............ H04L 63/0272 |
| 2006/0256733 A1 | 11/2006 | Bejerano |

(Continued)

FOREIGN PATENT DOCUMENTS

CN          102598591        7/2012

OTHER PUBLICATIONS

Chahbar et al, "NESSMA: Network Slice Subnet Management Framework", IEEE, 2020 (Year: 2020).*

(Continued)

*Primary Examiner* — Omer S Mian
(74) *Attorney, Agent, or Firm* — Robert C. Kowert; Kowert, Hood, Munyon, Rankin & Goetzel, P.C.

(57) ABSTRACT

A subnet of a logically isolated network within a provider network may be shared between client accounts of the provider network. A request to share a subnet of a logically isolated network created for one client account with another client account may be received. A link between an account object for the other client account and a shared subnet object for the subnet may be stored. When a request to host a resource with the subnet is received, an evaluation of the graph may indicate whether the request to place the host is permitted. If permitted, the resource for the other client host may be hosted within the subnet.

20 Claims, 9 Drawing Sheets

(56) References Cited

U.S. PATENT DOCUMENTS

| | | | |
|---|---|---|---|
| 2008/0225875 A1 | 9/2008 | Wray et al. | |
| 2016/0285678 A1* | 9/2016 | Rath | G06F 11/2097 |
| 2017/0185437 A1* | 6/2017 | Thomas | G06F 9/45558 |
| 2017/0308401 A1* | 10/2017 | Argenti | G06F 9/5027 |
| 2019/0140895 A1* | 5/2019 | Ennis, Jr. | G06F 9/54 |

OTHER PUBLICATIONS

Extended European Search report from Application No. 18208718. 9-1221, (Amazon Technologies, Inc.), dated Mar. 15, 2019, pp. 1-9.

* cited by examiner

_SHARING A SUBNET OF A LOGICALLY
ISOLATED NETWORK BETWEEN CLIENT
ACCOUNTS OF A PROVIDER NETWORK_

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each virtual machine being a software simulation acting as a distinct logical computing system that provides users with the illusion that they are the sole operators and administrators of a given hardware computing resource, which also provides application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies have given rise to provider networks, which offer various services or resources to customers via network connections. As the amount of data, transactions, and other interactions with provider networks increase, so too do the various connection requirements for customers of provider networks. Some customers may wish to take advantage of specifying how network traffic is to be handled within provider networks using logically isolated networks within the provider network. Logically isolated networks may provide a customizable virtual networking environment for virtual computing resources hosted within a logically isolated network, allowing for optimized traffic routing, security, or connections to be established to use the virtual computing resources in the provider network. Thus, techniques that further extend the use of some or all of a logically isolated network are highly desirable.

Figure 1:
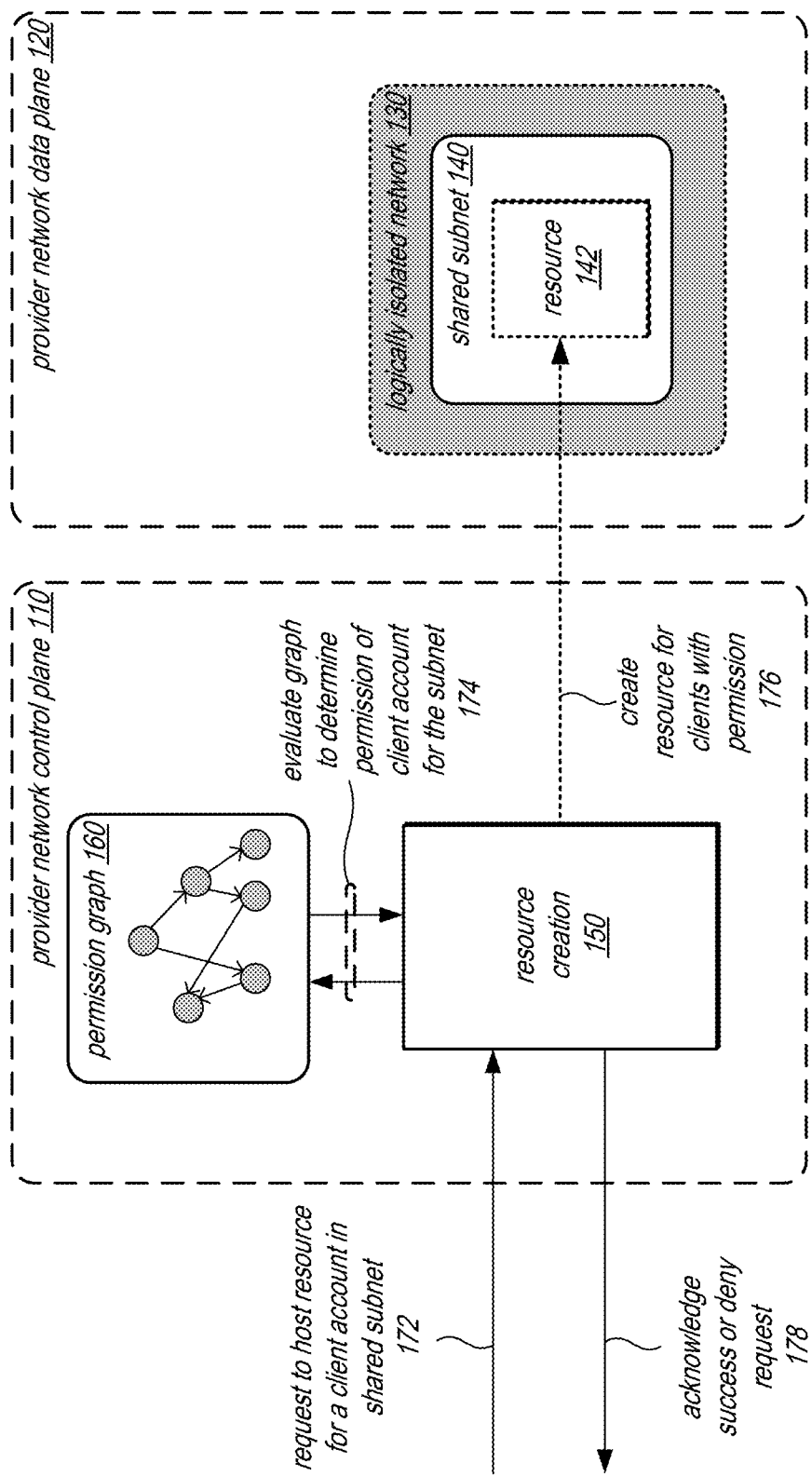
FIG. 1 is a logical block diagram of sharing a subnet of a logically isolated network between client accounts of a provider network, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of sharing a subnet of a logically isolated network between client accounts of a provider network are described herein. A provider network, system, or service may implement a network to allow clients, operators, users, or other customers to use, access, operate, or otherwise control one or more computing resources hosted within the network. These resources may include various types of computing systems or devices that can communicate over the network in order to perform various tasks, operations, or services on behalf of the clients. For example, in some embodiments, a provider network may provide virtual computing resources to clients, users, or other type of customers, in the form of reserved compute instances (e.g., a virtual machine acting as a distinct logical computing system that provides users with the illusion that they are the sole operators and administrators of a given hardware computing resource). Customers of the provider network may reserve (i.e., purchase or buy) one or more compute resources (such as compute instances) or utilize other resources to perform various functions, services, techniques, and/or applications.

A provider network may offer client accounts (e.g., customers, users, operators, or other entities) client account-specific security features, in various embodiments. For example, a logically isolated network (which may also be referred to in some environments as a virtual private cloud or VPC) may include a collection of computing and/or other resources in a logically isolated section of the provider network, over which the entity (e.g., client account) using the logically isolated network is granted substantial control with respect to networking configuration. In some embodiments, for example, a customer may select the network address ranges (e.g., Internet Protocol (IP) address ranges or blocks via Classless Inter-Domain Routing (CIDR) notation) to be used for the logically isolated network resources, manage the creation of overlay networks, such as subnets within the logically isolated network, and the configuration of route tables, gateways, etc. for the logically isolated network.

Subnets may offer client accounts of resources hosted in the subnet greater control to route network traffic among resources hosted within the subnet. For example, subnets may allow for the different types of network traffic to be diverted to different resources within the subnet in order to meet quality of service or other performance goals without requiring changes to the operation of substrate networks over or upon which the subnet is implemented, in some embodiments.

Provider networks may implement client accounts to provide various forms data collection, isolation, and control for resources associated with or created for the client account. For example, billing, metering, monitoring, or other data collection features may also be isolated to a client account. In another example, a client account may be a unit of access control which can be used to restrict access to data, applications, or other resources in the provider network, such as restricting access to a logically isolated network and its subnets to the client account.

While the benefits of data collection, isolation, and control continue to provide value to users of a provider network, the movement of large scale networks and infrastructure to provider networks has made managing some features like network configuration challenging at the level of granularity provided by client accounts. Instead of creating complex and difficult to manage network infrastructures using peering and network meshes to stitch together hundreds of client accounts and individual logically isolated networks, sharing subnets of a logically isolated network across client accounts may allow for a centralized management model for resources creating an experience across the accounts of a single, flat network. In this way, networking for various client accounts can be centrally managed (e.g., combining hundreds of accounts together as a single account for network management, while individual account owners can focus on the performance of their respective resources.

Sharing resources between client accounts may allow for hybrid architectures, such as viewing hosted resources in a provider network to act as an extension of an on-premise network. Moreover, account-based sharing can still allow for varying degrees of centralization when appropriate (e.g., client accounts do not have to share all subnets, can both share and participate in a shared subnet, etc.).

Graph permission structures for identifying shared subnet permissions may provide a performant and flexible schema for representing the diverse relationships between client accounts that share and/or participate in shared subnets, in some embodiments. FIG. 1 is a logical block diagram of sharing a subnet of a logically isolated network between client accounts of a provider network, according to some embodiments. A provider network may utilize a control plane 110 for handling creation, maintenance, and other infrastructure for hosted resources, including networking. Provider network data plane 120 may provide the hardware (e.g., servers, networking devices, or other computing devices like computing system 2000 in FIG. 11) to host resources in a provider network on behalf of client accounts.

Provider network control plane 110 may represent shared subnets of a logically isolated network between client accounts in permission graph 160. As discussed in more detail below with regard to FIGS. 4, 5, and 8, a permission graph may represent the relationships between shared subnets and client accounts in order to determine whether resources for a client account can be hosted in a shared subnet. For example, as illustrated in FIG. 1, a request to host a resource for a client account in a shared subnet 172 may be received. Resource creation 150 may evaluate 174 (or cause the evaluation of) permission graph 160 to determine whether subnet 140 of logically isolated network 130 has been shared with the client account. An association, path, or other link between a node representing the shared subnet and a node representing the client account may be identified to determine that the client has permission to host a resource in shared subnet 140. Resource creation may then create 176 resource 142 in shared subnet 175 and provide an acknowledgment 178. For client accounts without permission, the resource may not be created and a failure indication may be returned.

Please note that previous descriptions are not intended to be limiting, but are merely provided as an example of control planes, data planes, permission graphs, subnets, resource creation, and logically isolated networks. The number or arrangement of components may be implemented in many different ways.

This specification next includes a general description of a provider network, which may implement sharing a subnet of a logically isolated network between client accounts of a provider network. Then various examples of a provider network are discussed, including different components/modules, or arrangements of components/module that may be employed as part of implementing sharing a subnet of a logically isolated network between client accounts of a provider network. A number of different methods and techniques to implement sharing a subnet of a logically isolated network between client accounts of a provider network are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
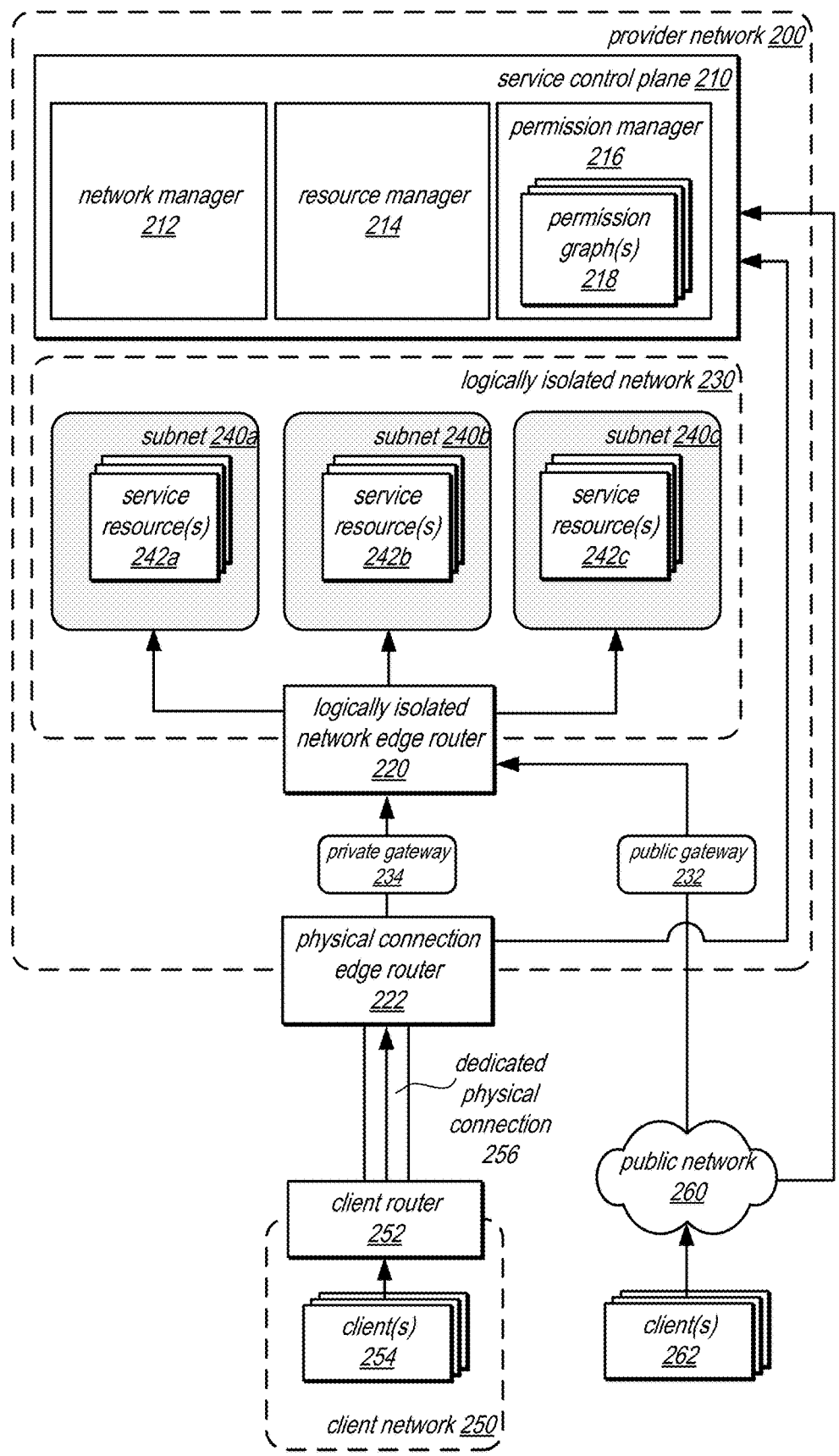
FIG. 2 is a logical block diagram of a provider network that implements sharing a subnet of a logically isolated network between client accounts of a provider network, according to some embodiments.

FIG. 2 is a logical block diagram of a provider network that implements sharing a subnet of a logically isolated network between client accounts of a provider network, according to some embodiments. Provider network 200 may offer various computing resources to clients, such as various types of data analysis, processing, and storage. Computationally intensive applications or systems may utilize multiple distributed computing resources in provider network 200 to provide scalable solutions for a variety of different computing applications. Provider network 200 may be may be set up by an entity such as a company or a public sector organization to provide one or more network-based services (such as various types of cloud-based computing or storage) accessible to clients (e.g., internal clients operating within provider network using provider network resources, or external clients, such as clients 262 via a public network 260 (e.g., the Internet), or clients 254 via a dedicated physical connection 256.

Provider network 200 may include numerous data centers hosting various resource pools, such as collections of physical and/or virtualized computer servers, storage devices, networking equipment and the like, needed to implement and distribute the infrastructure and services offered by the provider network 200. In at least some embodiments, provider network 200 may implement multiple fault tolerant zones, which may isolate failures to a particular zone such that a failure in or of one fault tolerant zone may not cause or trigger a failure in another fault tolerant zone (allowing computing resources in the other fault tolerant zone to continue operating in the event of a failure of another fault tolerant zone). Different data centers, isolated power or computing infrastructures, and/or other provider network architectures may be implemented to provide multiple fault tolerant zones (sometimes referred to as availability zones). While grouped together in FIG. 2, different resources for a client network, such as resource(s) 242a, 242b, or 242c, may be distributed across fault tolerant zones (not illustrated), in some embodiments.

Provider network 200 may include the hardware (e.g., modems, routers, switches, load balancers, proxy servers, etc.) and software (e.g., protocol stacks, accounting software, firewall/security software, etc.) necessary to establish networking links between different components of provider network 200 as well as external networks (e.g., the Internet) or client networks with dedicated physical connections. In some embodiments, provider network 200 may employ an Internet Protocol (IP) tunneling technology to provide an overlay network via which encapsulated packets may be passed through the provider network 200 using tunnels (which may be a substrate network upon which other networks, like logically isolated network 230 and overlay networks, like subnets 240, may be implemented).

Like provider network 200, a client network 250 may offer or provide various applications or services to users of the client network 250, utilizing resources such as client devices 252. For example, client network 250 may be one or more internal networks for one (or multiple) companies, enterprises or organizations. In some embodiments, client network 250 may provide publicly available services, which may be accessible via a public network like the Internet. As part of providing the respective services or functions, client network 250 may utilize various resources offered by provider network 200.

In order to enable connectivity between a client network 250 and multiple resource(s), such as resources 242a, 242b, and 242n, a dedicated physical connection 256 may be implemented. For example, the dedicated physical connection may include one or cables physically linking a pair of co-located routers, one belonging to or managed by the provider network (e.g., physical connection edge router 222) and one belonging to or managed by a client network (e.g., client router 252). However in some embodiments, a third party or entity may operate one or both of physical connection edge router 222 or client router 252. In at least some embodiments, the physical connection edge router 222 and the client router 254 may be located within a co-location facility. However, in other embodiments the two routers may not be located within a same facility or location.

In various embodiments, dedicated physical connection 256 may be utilized to provide a connection and interface to resources 242 in a provider network 200 via a private gateway 234. In at least some embodiments, private gateway 234 may be a physical or virtual network gateway to access logically isolated network 230 according to a private connection, such as dedicated physical connection 256. For example, private gateway 234 may enforce or otherwise implement access controls or security protocols to ensure that the network traffic received through private gateway 234 remains private to the client and destination resource that are communicating. In order to establish a private gateway 234, control request that the private gateway 234 be established over the already established dedicated physical connection 256 can be received. Various parameters may have to be supplied to an administrative component of provider network 200, such as network manager 212, in some embodiments. These parameters may include, for example, one or more of: (a) a VLAN (virtual local area network) identifier or tag that complies with the Ethernet 802.1Q standard, (b) an Internet Protocol (IP) prefix, address range or address, (c) a Border Gateway Protocol (BGP) Autonomous System Number (ASN), or (d) a BGP key. Once established, various systems, components, or devices 254 in client network 250 may communicate with resources 242 through the private gateway 234.

In some embodiments, a VPN connection between a client implemented gateway within a client network 250 (not illustrated) could be established with private gateway 234 to provide a virtual private connection. Such communications could pass over a public network like public network 260, but may utilize private gateway 234 to access resources 240.

Public gateway 232 may provide a physical or virtual gateway that allows communications between resources 242 hosted within logically isolated network 230 and a public network, such as a wide area network like the Internet. For example, a subnet 240 may include a network route that points to public gateway 232 in order to allow traffic to and from resources in the subnet 240 via public network 260, in some embodiments.

Provider network 200 may allow for portions of provider network 200 to be provisioned as a logically isolated network 230 within or portion of provider network 200, in order to allow a customer or user associated with a client account to specify the configuration of the provider network, utilizing features such as specifying a range of network addresses (e.g., via a CIDR block), creation of overlay networks, such as subnets 240a, 240b, and 240c (which may be specified with different CIDR blocks), create and/or manage network route tables and gateways (e.g., like public gateway 232 and private gateway 234). One or more network devices, such as logically isolated network edge router 220, may implement or enforce the specified network configuration, such as handling requests received via private gateway 234 and public gateway 232 according to the parameters or configuration of those gateways, in some embodiments.

Service resources, such as service resources 242a, 242b, 242c, may be resources of one or multiple different services offered by provider network 200 (e.g., virtual compute, data processing, data storage, etc.). Provider network 200 may implement one (or more) of service control plane 210 to manage the various resources 242 offered by provider network 200. Service control plane 210 may be implemented by various collections servers, nodes, computing systems or devices, such as may be generally described below with regard to computing system 2000 in FIG. 11. Service control plane 210 may implement an interface, as discussed below in FIGS. 4, 6 and 7, which may be accessible either by client devices 254 over dedicated physical connection 256, or by client devices 262 using public network 260 (which may be associated with client network 250 or linked to common client accounts of the different client networks).

The interface may dispatch requests to the appropriate service control plane component(s) to handle the requests such as requests to procure, reserve, enable, disable, configure, or otherwise manage the resources 242 dispatched to resource manager 214 and/or various network management requests sent to network manager 212 to manage logically isolated network 230 and/or subnets 240. For example, the interface may provide the various interfaces described below with regard to FIGS. 4 6-7, and 9-10. The interface may be programmatic, such as may be implemented by an Application Programming Interface (API), command line interface, and/or a graphical user interface (GUI), in some embodiments.

As discussed in more detail below with regard to FIG. 4, permission manager 216 may store or have access to permission graphs 218 which may be used to determine the permission of various client accounts to utilize shared subnets, according to some embodiments.

In at least some embodiments, service control plane 210 may implement various resource management functions as part of resource manager 214. For example, creating/launching and configuring the various resources 242 may be internally managed and performed by resource manager 214. Other control plane function(s) may also be implemented by other management components not illustrated, and may include authenticating client(s) (e.g., associating them with particular client accounts), metering resource usage for different client networks, billing client accounts associated with the client networks, and any other management or control functions to provide the various services of provider network 200.

Service control plane 210 may implement network manager 212, as discussed in more detail below with regard to FIG. 4 to manage logically isolated networks and subnets for resources 242. In some embodiments, network manager 212 may be implemented as a separate service from the resource host service (e.g., utilizing a separate control plane to manage servers, hosts, or other computing devices that manage networks and a separate data plane to store network management information (e.g., routing tables, access rules, etc.). Thus, the previous example architecture is not intended to be limiting.

In various embodiments, clients 254 or 262 may encompass any type of client that can utilize, manage, operate or configure connections or resources in provider network 200. For example, a client may implement various tools, scripts, or other modules that may be able to configure a respective logically isolated network 230 or overlay network 240. As part of managing the networks, clients 254 or 262 may submit various requests to provider network 200 via an interface for service control plane. In order submit requests to provider network 200, a client may include a suitable version of a web browser, or may include a plug-in module or other type of code module configured to execute as an extension to or within an execution environment provided by a web browser. Alternatively, a client may encompass an application such as a resource/connection management or information client (or user interface thereof) that may make use of provider network 200 to manage various resources and connections. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 262 may be configured to generate network-based services requests according to a Representational State Transfer (REST)-style network-based services architecture, a document- or message-based network-based services architecture, or another suitable network-based services architecture.

In some embodiments clients 262 may convey requests to provider network 200 via a public network 260, which may be a public connection to provider network 200. In various embodiments, the public network 260 may encompass any suitable combination of networking hardware and protocols necessary to establish network-based communications between clients 262 and provider network 200. For example, a network may generally encompass the various telecommunications networks and service providers that collectively implement the Internet. A network may also include private networks such as local area networks (LANs) or wide area networks (WANs) as well as public or private wireless networks.

Figure 3:
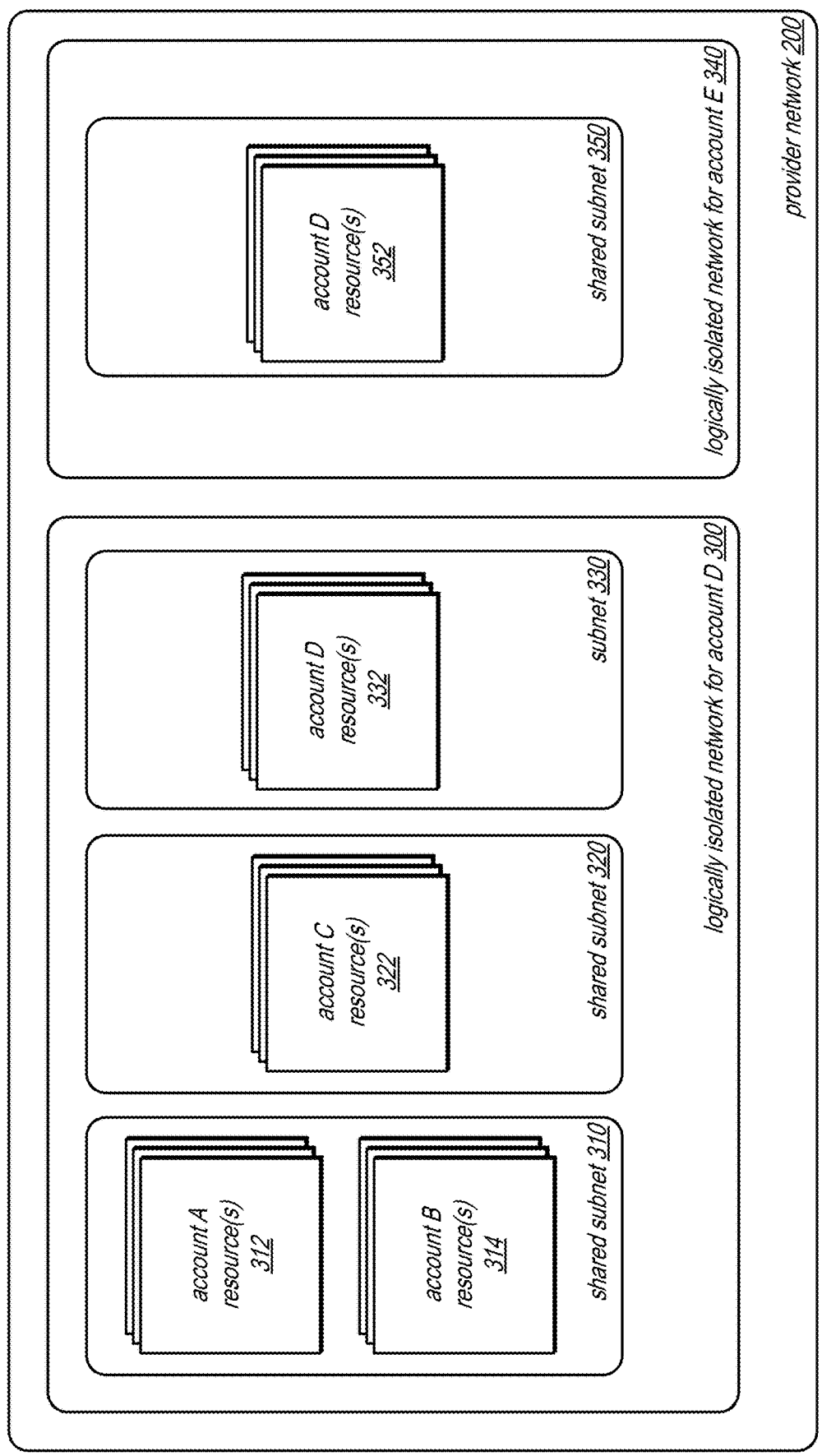
FIG. 3 is logical block diagram illustrating shared subnets, according to some embodiments.

FIG. 3 is logical block diagram illustrating shared subnets, according to some embodiments. Because subnets can be shared with different client accounts, various configurations of account resources and subnets can be implemented. For example, in FIG. 3, logically isolated network for account D 300 may implement three subnets, 310, 320, and 330. Two the subnets, 310 and 320, may be identified during creation (or afterward) as shared subnets. For example, as discussed below with regard to FIG. 4, client account D may share subnets 310 and 320 with other client accounts, allowing the other client accounts to place resources within. In shared subnet 310, for example, account A hosts resources 312 (which may be a combination of any one or more of the different network-based services offered by provider network 200 discussed above). Similarly, account B may have resources 314 in shared subnet 310. Client account D may have shared a different subnet, subnet 320 with another client account C, which may also have implemented resources 322 in shared subnet 320.

A client account does not have to share all subnets created in a logically isolated network. For example, subnet 330 is not shared with any other client account and instead only hosts account D resources 330. Additionally, a client account that is the owner of a logically isolated network (e.g., account D for logically isolated network 300) may be a participant, sharing a subnet of another client account's logically isolated network. For example, logically isolated network for account E 340 has a shared subnet 350, which has been shared which client account D so that account D resources 352 hare implemented within shared subnet 350.

Figure 4:
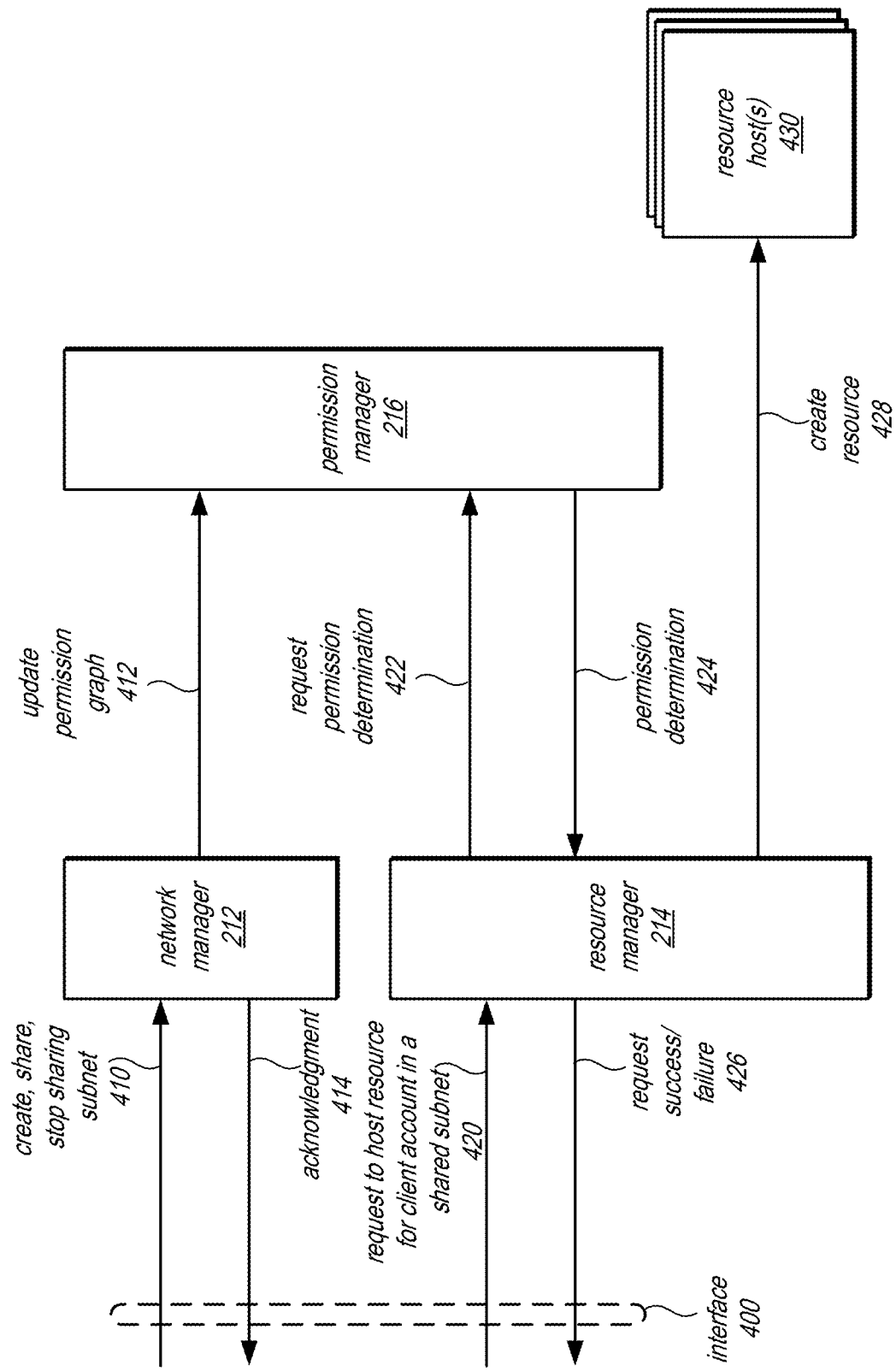
FIG. 4 is a logical block diagram illustrating interactions to create, share, and stop sharing subnets in a logically isolated network, according to various embodiments.

FIG. 4 is a logical block diagram illustrating interactions to create, share, and stop sharing subnets in a logically isolated network, according to various embodiments. Interface 400 may be a command line interface, programmatic interface (e.g. APIs), and/or graphical user interface to support different network and resource management requests. For example, requests to create a logically isolated network or subnet, share or stop sharing a subnet 410 may be sent to network manager 212 via interface 400. For creation requests, network manager 212 may perform various operations at network devices (e.g., routers, switches, etc.) in order to configure the various networking controls to implement the logically isolated network and/or subnet. For example, network manager 212 may share a CIDR block for a subnet with routers, like network edge router 220 in FIG. 2, so that communications to the subnet can be properly routed. An update to a permission graph 412 may be performed so that a subnet object (and/or logically isolated network object) can be created.

Similarly, requests to share and stop sharing a subnet may be managed by network manager 212. For example, access control lists or other network traffic controls to enforce the subnet may be updated to include or exclude traffic from other client accounts, ranges of network addresses, other subnets, network gateways, specific hosted resources, and so on. Network manager 212 may also request an update to permission graph 412 corresponding to the sharing or stop sharing (e.g., creating a shared subnet object, adding or removing a link between an account object for a client account and a sharing, etc.). Network manager 212 may acknowledge the success or failure of network management requests 410.

Network manager 212 may impose various limitations on subnet sharing and other network management requests. For example a limitation on the number of client accounts that can share a subnet may be enforced (e.g., less than or equal to 50 accounts). In some embodiments, client account-specific limitations, such as network configuration limitations like a limitation on the number of security groups or other network traffic controls in a subnet may be enforced. When a subnet has stopped being shared with a client account, resources hosted in that subnet may continue in the subnet until shutdown (or failure), in some embodiments. In this way, stop sharing requests may not cause data loss by killing ongoing work in the subnet.

Permission manager 216 may implement or have access to a graph data store (e.g., by storing objects or data items with various pointer, links, or other associations that can be searched or evaluated using various graph search techniques). For example, to store the illustrated graph in FIG. 5 in a data store, the described objects/nodes, links, edges, attributes, and the like may be modeled and stored after a Resource Description Framework (RDF) data, in some embodiments. RDF data may be structured as (Subject, Predicate, Object) tuples. To represent the graph based on RDF, there may be multiple types of RDF predicates. In some embodiments, one type of RDF predicates may represent links of the graph structure and another type of RDF predicates may represent attributes of the graph structure. Different types of predicts may represent the graph data structure differently. Link predicates may be between two objects, whereas attribute predicates may be between a node and a value. In other embodiments, other graph storage techniques, structures, or systems may be implemented and thus the previous examples are not intended to be limiting.

Update requests 412 may be performed by permission manager 216 by inserting the appropriate objects into a graph, removing and/or modifying links between objects in a graph, in some embodiments. Consider the RDF model above. When inserting a new object such as a new shared subnet object or client account object, a record may be inserted into a table or other underlying storage for the graph data store using the RDF model to the new object and its relationships with other objects like client account objects. Similar operations may be performed to remove or modify links.

Interface 400 may also support requests to host resources 420 in a shared subnet. Resource manager 214 may perform the techniques discussed below with regard to FIG. 8 to determine whether the request can be performed. For example, resource manager 214 may make a request 422 to permission manager 216 to determine whether the client account has permission to host a resource in the subnet. One (or multiple) graph search algorithms may be implemented to determine whether a link between an account object for the client account and the shared subnet object exists. The determination 424 may be sent to resource manager 214. If yes then the request may succeed. If no then the request may fail. An indication of success or failure may be sent 426.

For a successful request, resource manager 214 may create the resource 428 on one or more resource host(s) 430 which can then be reached within the shared subnet.

Figure 5:
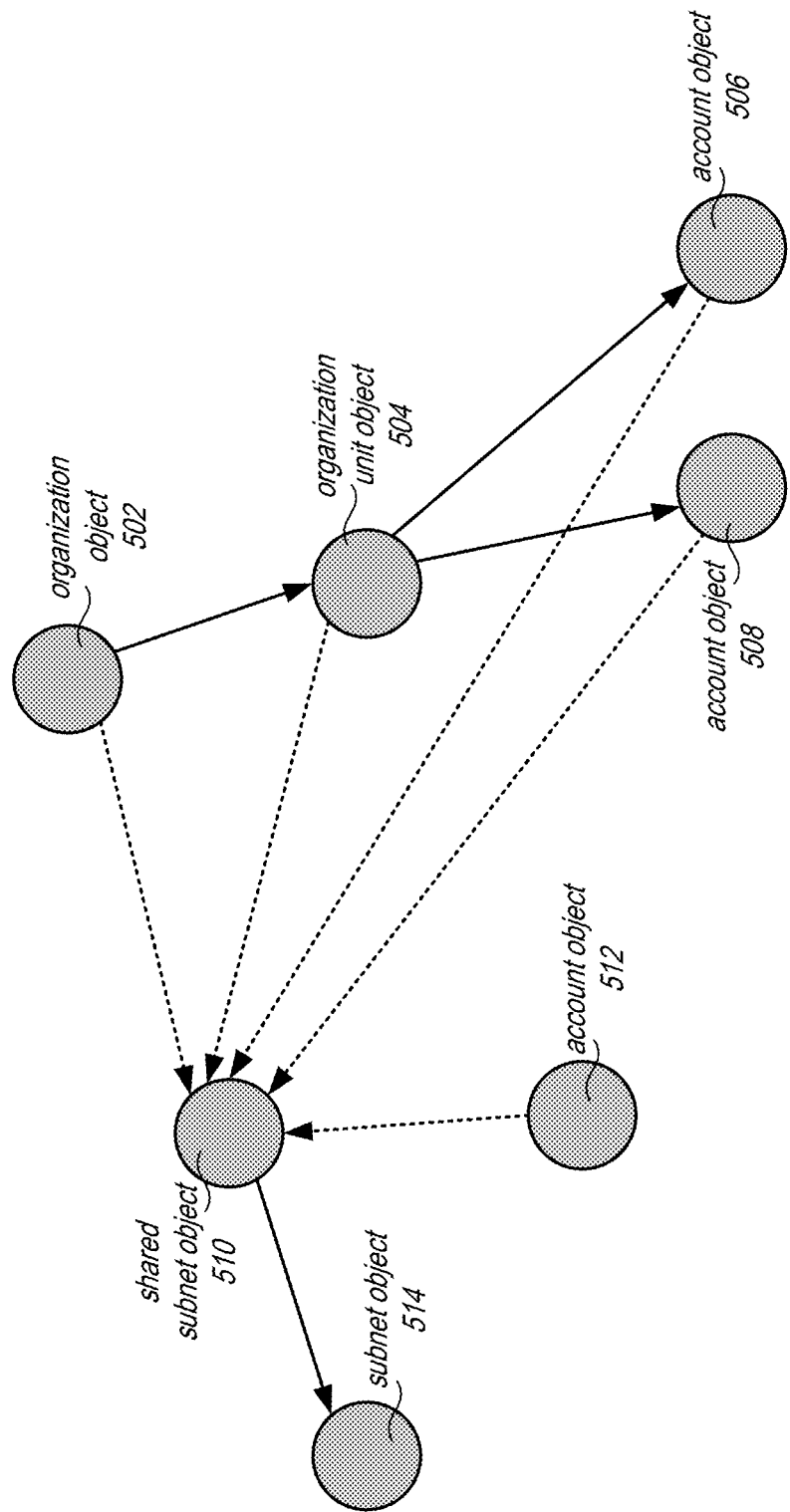
FIG. 5 is an example permission graph for sharing subnet of a logically isolated network, according to various embodiments.

FIG. 5 is an example permission graph for sharing subnet of a logically isolated network, according to various embodiments. A permission graph may include objects that represent client accounts, organization structures for a client account, and resources to be shared, in some embodiments. For example, organization object 502 may provide a top-level organizational structure for client accounts (and/or resources). Child objects, such as organization unit object 504, may be used to subdivided or separate out some of the account or resource objects in the organization structure represented by organization object 502. For example, account objects 506 and 509 may be part of organization unit object 504. In this way client account associations, can be controlled. with granularity.

Shared resource objects, such as shared subnet object 510, may be shared with individual account objects, organization unit objects and/or organization objects. In this way, sharing of the subnet may be controlled by the link. If, for instance, a client account is linked through an organization object or organization unit object that is linked to the shared subnet object, if the client account is removed from the organization object or organization unit object then the client account may automatically no longer share the subnet. Similarly, when requesting to share the client account, link to the organization object may prevent a shared subnet from having to be manually linked to a large number of client accounts that may be in the organization. Some account objects, like account object 512 may be outside of one (or any) organization. For example, a separate company from the company of organization object 502 may have client account 512 which can create or share a crated shared subnet object 510, and thus share the subnet of subnet object 514.

Figure 6:
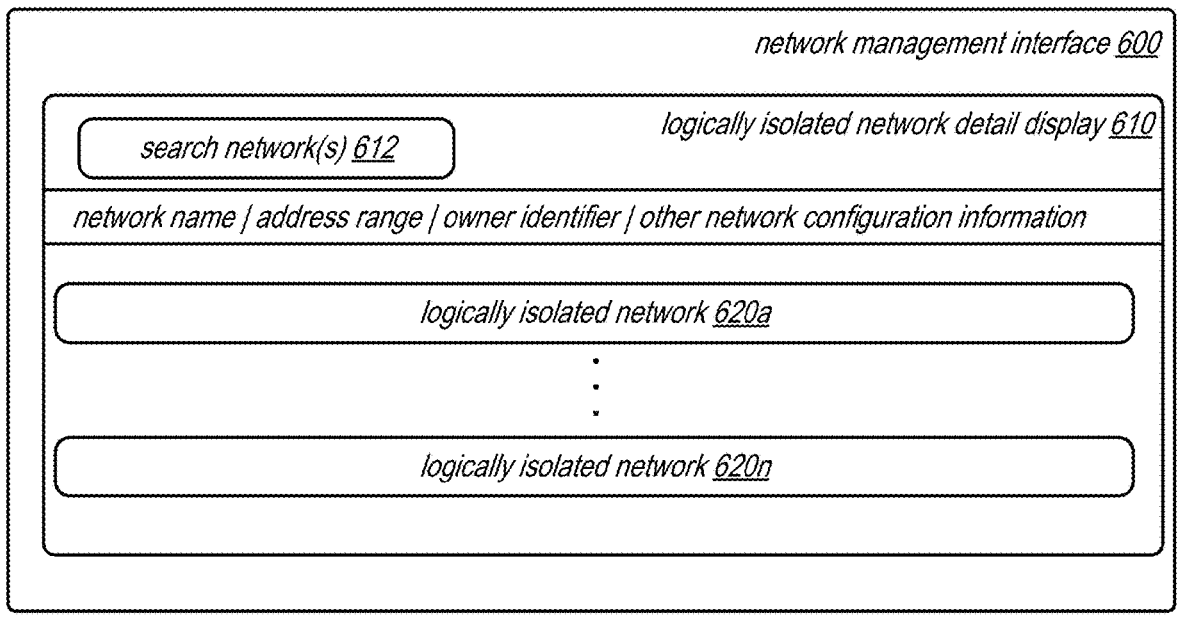
FIG. 6 is an example graphical user interface that may describe available logically isolated networks for a client account, according to various embodiments.

Various requests in addition to those discussed above with regard to FIG. 4 may be handled by an interface of provider network 200. FIG. 6 is an example graphical user interface that may describe available logically isolated networks for a client account, according to various embodiments. Network management interface 600 may provide a graphical user interface which may display an area for detailed display of logically isolated network information for a client account that is signed in or credentialed with network management interface 600. A search element 612 may be used to request or discover logically isolated networks 620*a* through 620*n* which may be available to the client account. A logically isolated network that is not owned by the client account may still be available to the client account by a subnet shared with that client account. Various details may be displayed, such as the network name (and/or identifier), address range (e.g., CIDR block), owner identifier (e.g., user account name), or other network configuration information (e.g., DHCP options, route table, access control list, etc.).

Figure 7:
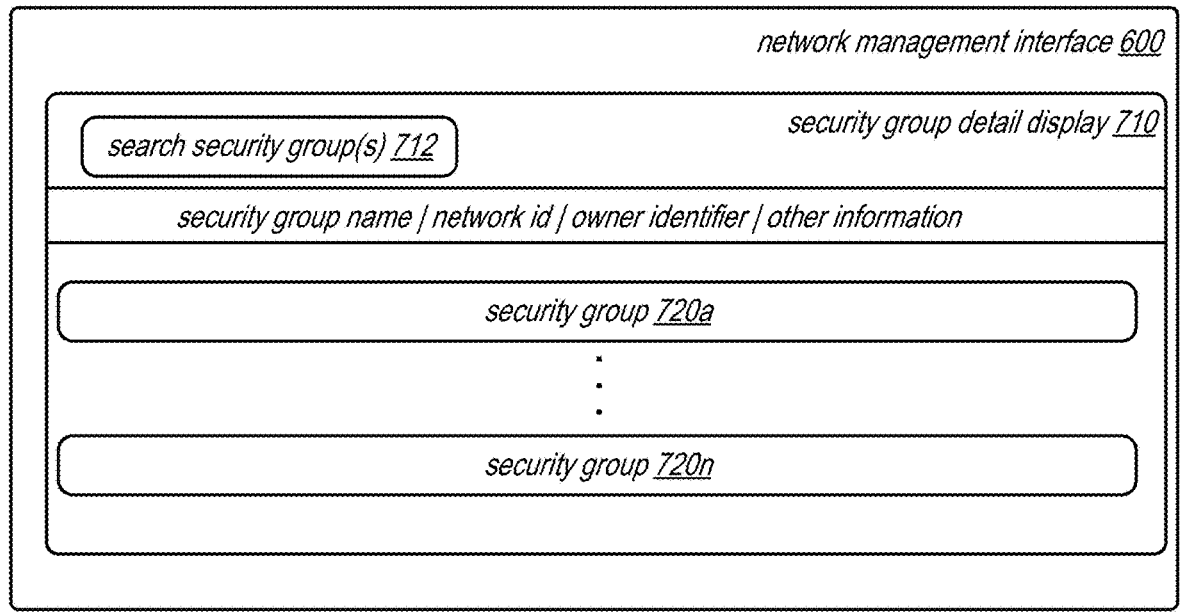
FIG. 7 is an example graphical user interface that may describe security groups for a logically isolated network, according to various embodiments.

As discussed below with regard to FIG. 9 most network configuration information may be isolated to the owner of a logically isolated network. However, some network controls, such as virtual firewalls or security groups that control inbound and outbound traffic for resources may be managed by an owner of a resource and not by an owner of the logically isolated network (unless they are the same client account). FIG. 7 is an example graphical user interface that may describe security groups for a logically isolated network, according to various embodiments.

Security group detail display 710 may include a search element 712 to identify security groups for a client account. The security groups that are visible may be those that are for account owned resources as well as shared subnets for which the client account is an owner or participant (even if not managed by the client account). Information, such as security group name, network identifier, owner identifier, and other information may be displayed for visible security groups 720*a* through 720*n*.

Figure 8:
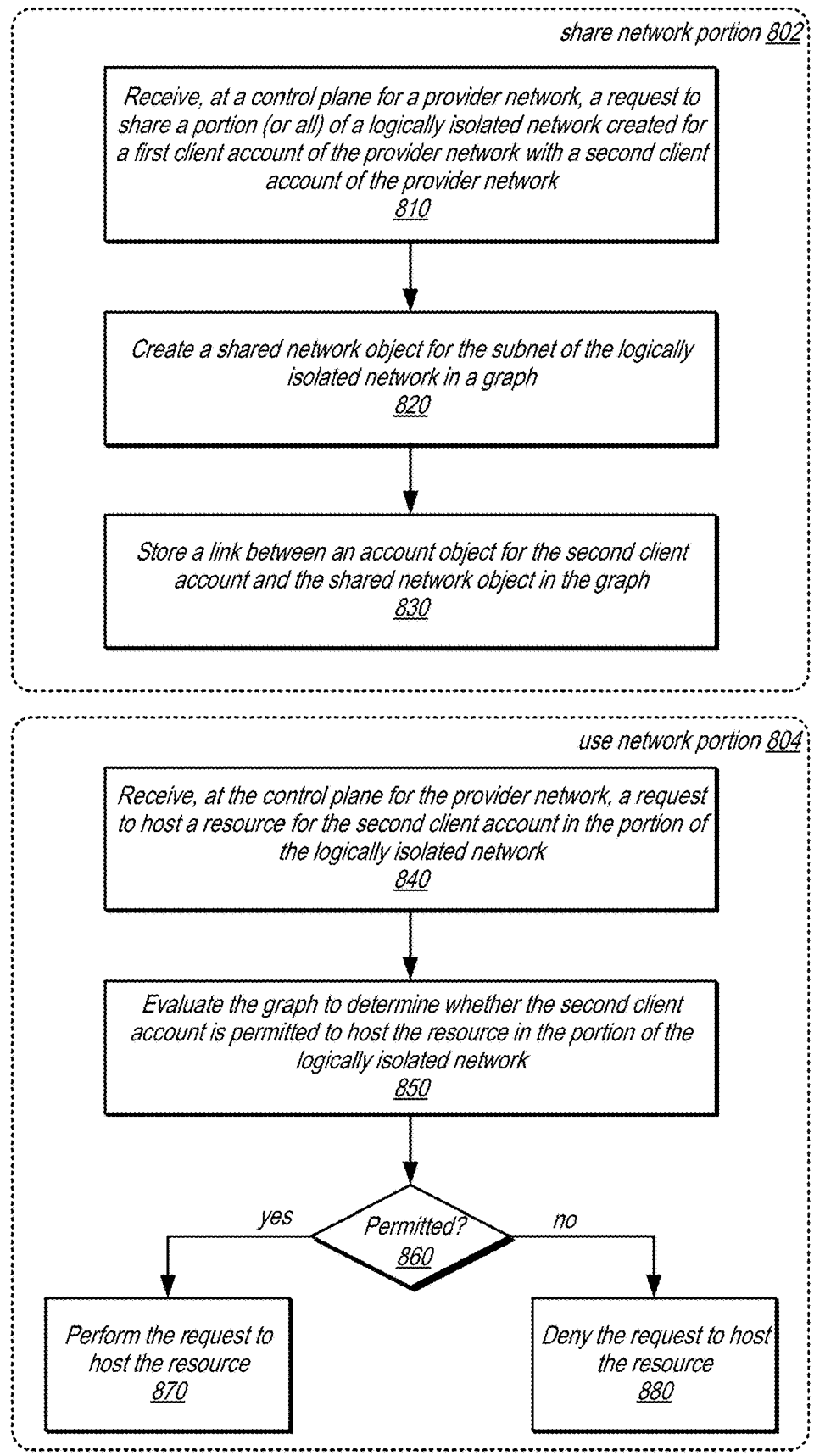
FIG. 8 is a high-level flow chart that illustrates various methods and techniques for sharing a subnet of a logically isolated network between client accounts of a provider network, according to various embodiments.

The examples of sharing a subnet of a logically isolated network between client accounts of a provider network discussed above with regard to FIGS. 2-7 have been given in regard to a provider network. Various other types or configurations of a system or service that hosts network resources for different accounts and allows logically isolated networks may implement these techniques. Thus, the components such as those discussed above with regard to FIGS. 2-7 may be differently implemented and still perform sharing a subnet of a logically isolated network between client accounts of a provider network. FIG. 8 is a high-level flow chart that illustrates various methods and techniques for sharing a subnet of a logically isolated network between client accounts of a provider network, according to various embodiments. These techniques may be implemented using various components of a provider network as described above with regard to FIGS. 2-7 or other provider network components.

A logically isolated network within a provider network may be created for a client account (e.g., a first client account) of a provider network, in some embodiments. During creation of the logically isolated network (or afterward) the logically isolated network may be designated for sharing (e.g., according to a setting or parameter set by a user during a creation workflow via a user interface for the provider network). A network configuration for the provider network may be established during creation (e.g., access control lists, route tables, DHCP options, DNS settings, network peering connections, public or private network gateways, network endpoints, network auditing or monitoring) and may be later modified, as discussed below with regard to FIG. 9.

One (or more) subnets may be specified for the logically isolated network as part of creating (or later modifying) the logically isolated network. A subnet may be an overlay network for a portion of the logically isolated network. A subnet may be specified in various ways, such as by specifying a range of network address ranges (e.g., Internet Protocol (IP) address ranges or blocks via Classless Inter-Domain Routing (CIDR) notation).

As indicated at 810, a request may be received at a control plane for a provider network to share a portion (or all) of a logically isolated network created for the first client account (e.g., the owner of the logically isolated network) with a second client account of the provider network (e.g., a participant account), in some embodiments. The request may be received via an interface for the provider network, as discussed above, which may include, but are not limited to support for a command line interface, graphical user interface, and/or a programmatic interface (which may be invoked by client applications sending requests formatted according to respective APIs), in some embodiments. The request may identify the second client account according to an account name or other identifier, in some embodiments. Similarly, the portion may be identified according to an identifier (e.g., of a subnet that has been previously defined/created or is defined/created in the request to share the subnet) or the range of network addresses specified for the portion, in some embodiments. In at least some embodiments, the request may be rejected if not received from the owner (first client account) of the logically isolated network (e.g., which may be verified by an identity token, or other credential(s)). In other embodiments, a participant client account may request the subnet be shared but the request may not be performed without confirmation from the owner of the logically isolated network. The request may trigger performance of a share subnet workflow 802 (e.g., performed by control plane components, such as resource manager 214 and permission manager 216 discussed above with regard to FIG. 2).

As indicated at 820, a shared network object for the subnet of the logically isolated network may be created in a graph, in some embodiments, (e.g., like shared subnet object 510 discussed above with regard to FIG. 5. For example, the control plane may invoke an API for a graph data store (or hierarchical data store) to create the shared network object in the graph. In some embodiments, the shared network object may include various descriptive information, such as status or other information descriptive of the subnet, a creation time for the shared network object, a resource type (e.g., subnet), an identifier, an owner identifier, and so on. As illustrated above in FIG. 5, a separate network or logically isolated network object (which may have been created when the network or logically isolated network was created) may also be linked to the shared network object.

As indicated at 830, a link between an account object for the second client account and the shared network object in the graph, may be stored, in some embodiments. The account object for the second client account may be created, in some embodiments, when the second client account is created (or may also be created when the shared subnet object is created above). The link may be indicated by a pointer, address, path, or other location information that may allow a lookup, search, or other evaluation of the graph to determine that the second client account is linked to the shared network object. In some embodiments, the link may be direct or may be indirect and pass through one or more intervening objects (e.g., a link to an organization or organization unit as illustrated in FIG. 5 above) so that graphs that represented inherited features or properties (e.g., according to directed links, like parent or child links) may quickly searched or updated for representing the permissions of objects represented in the graph).

A workflow to use the shared network portion 804, may be triggered when a request is received at the control plane for the provider network to host a resource for the second client account in the shared portion, in various embodiments, as indicated at 840. The request may specify the portion according to an identifier or network address range, as discussed above, and may also specify the second client account according to a name or other identifier. The request may also specify information that describes the resource to be hosted (e.g., type, configuration, image, template, volume, or other features/information for creating and launching the resource at a resource host that is included within the portion). The resource can be any one of the various types of resources discussed above with regard to provider network 200 (e.g., virtual compute instance, container, data store, database, processing cluster, serverless resource, and so on).

As indicated at 850, the graph may be evaluated to determine whether the second client account is permitted to host the resource in the portion of the logically isolated network, according to some embodiments. For example, the control may send a request to the graph-based data store to perform a lookup operation according to the identifier of the second client account. The graph-based data store may perform one or more traversals, or other searching algorithms from the account object of the second client account to find if a link exists between the account object for the second client account and the shared network object. If the link exists, then the request to host the resource for the second client account may be permitted, and as indicated by the positive exit from 860, the request to host the resource may be performed, as indicated at 870. For example, the various operations to provision/obtain hardware and/or software to host the resource and operations to install, configure, initiate, or otherwise start execution of the resource on the provisioned hardware.

If no link is found, then as indicated by the negative exit from 860, the request to host the resource may be denied, as indicated at 880. An error indication may be returned, in some embodiments, indicating a lack of permission and an identifier of the owner account of the logically isolated network.

As discussed above, requests to stop sharing a portion of the logically isolated network may be performed, using similar techniques to those described, but instead describing which portion of the logically isolated network and client account in order to remove the link in the graph indicating permission.

In order to share portions of the logically isolated network like subnets, control of the logically isolated network overall or as a whole may be separated or isolated from control of resources hosted within portions of the logically isolated network, in some embodiments. In this way, data and operational security between participant account(s) and the owner may be enforced allowing for various different scenarios where accounts for separate organizations or entities (e.g., accounts for different companies) may still operate together within a same logically isolated network in order to gain performance benefits for operations that are jointly performed without sacrificing the ability of the individual entities to keep private that information which they do not wish to share.

Figure 9:
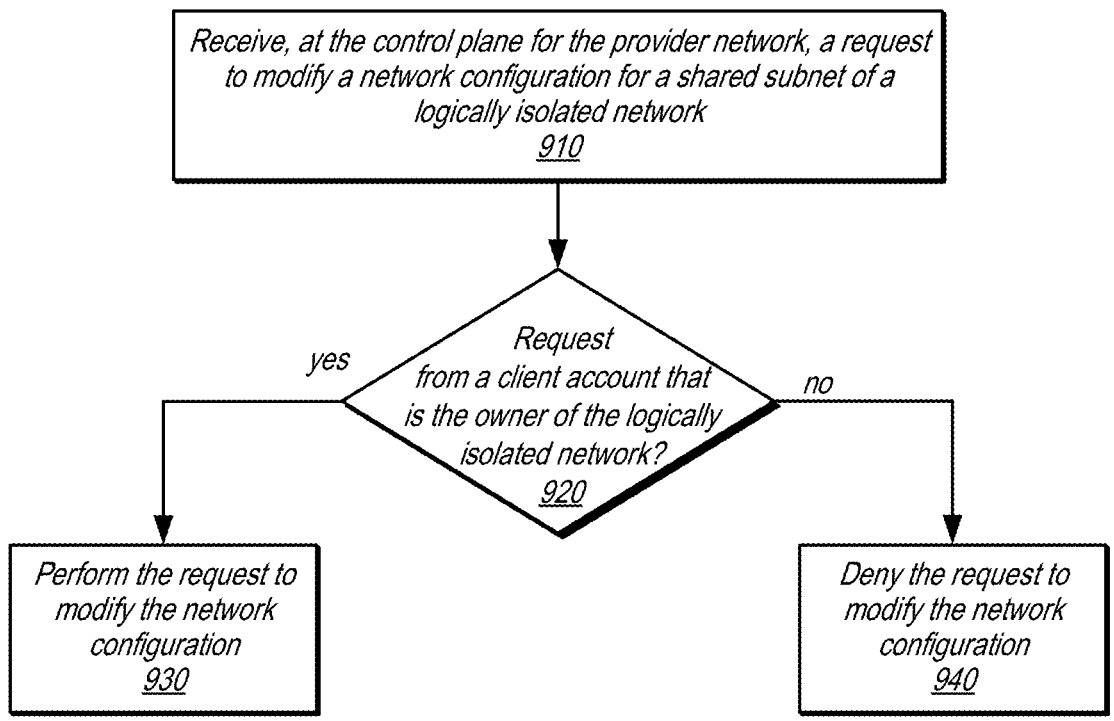
FIGS. 9-10 are high-level flow charts that illustrate various methods and techniques for separating control of shared subnets in a logically isolated network from control of resources hosted within shared subnets, according to various embodiments.
Figure 10:
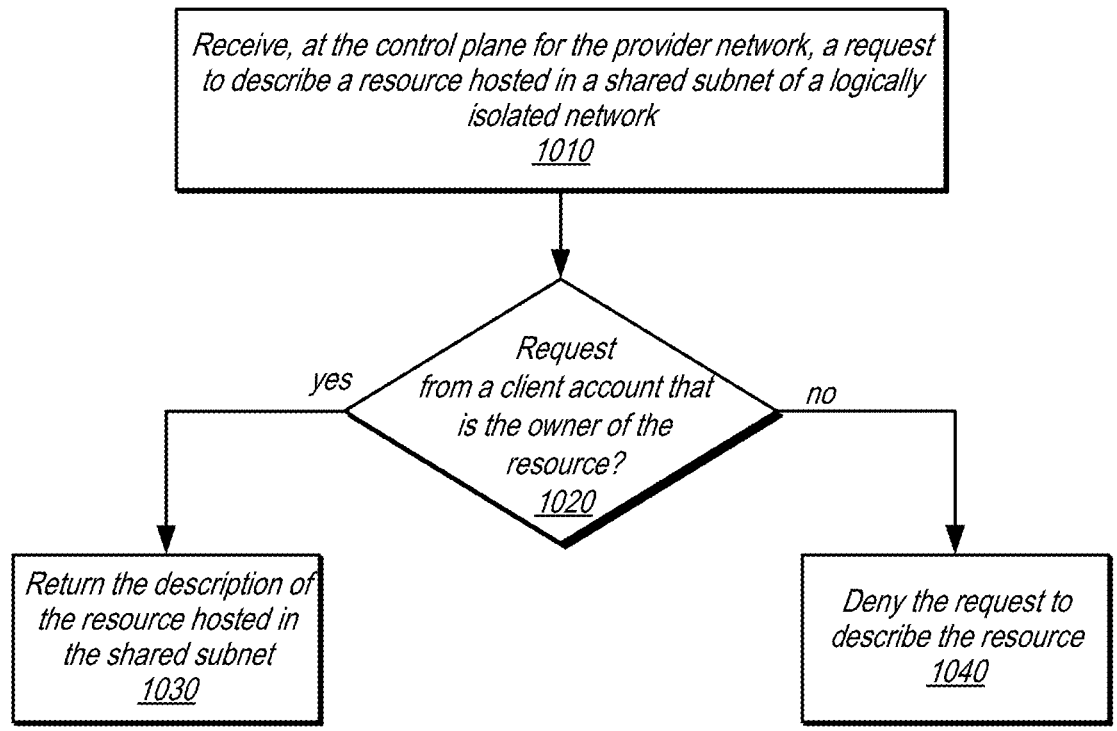

FIGS. 9-10 are high-level flow charts that illustrate various methods and techniques for separating control of shared portions of a logically isolated network that are subnets in the logically isolated network from control of resources hosted within shared subnets, according to various embodiments. In FIG. 9, for example, a request may be received at a control plane for a provider network to modify a network configuration for a shared subnet of a logically isolated network, in some embodiments, as indicated at 910. For example, the request may attempt to modify access control lists, route tables, DHCP options, DNS settings, network peering connections, public or private network gateways, network endpoints, network auditing or monitoring, or other network configuration for the logically isolated network.

Although a client account that is a participant in one or more subnets of the logically isolated network can have some visibility into the logically isolated network in order to implement and manage hosted resources, control of the configuration of the network may be restricted. As indicated at 920, a determination may be made as to whether the request is from or associated with a client account that is the owner of the logically isolated network, in some embodiments. An object for the logically isolated network may, for instance, record an identifier of the owner, which may be compared with the account that submitted or is associated with the request. If the request is not from the owner, then as indicated at 940, the request to modify the network configuration may be denied. If, however, the request is from the owner, then the request to modified the network configuration may be performed, as indicated at 930.

Not all network configuration requests may be restricted to owners. As discussed above with regard to FIG. 7, firewall or other traffic restrictions/rules can be implemented or defined by a client account for the resources hosted in a subnet (e.g., a security group which may group or associate resources with one or more traffic controls). An owner of a logically isolated network that is not also an owner of the resources may be unable to modify the security group for instance, even if the existence (and possibly contents) may be visible to the owner of the logically isolated network.

Other requests may be separated or isolated to owners of the resources hosted in a shared subnet. In FIG. 10, a request to describe a resource hosted in a shared subnet of a logically isolated network may be received at a control plane, as indicated at 1010, in some embodiments. As indicated at 1020, a determination may be made as to whether the request is from a client account that is the owner of the resource, in some embodiments. An object for the resource may, for instance, record an identifier of the owner, which may be compared with the account that submitted or is associated with the request. If the request is not from the owner, then as indicated at 1040, the request to describe the resource may be denied. If, however, the request is from the owner, then the request to describe the resource may be performed. Resource information (e.g., resource type, configuration, creation information, status information, networking information, dependencies, etc.) may be returned, as indicated at 1030.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the router data service described herein). The various methods as illustrated in the figures and described herein represent example embodiments of methods. The order of any method may be changed, and various elements may be added, reordered, combined, omitted, modified, etc.

Figure 11:
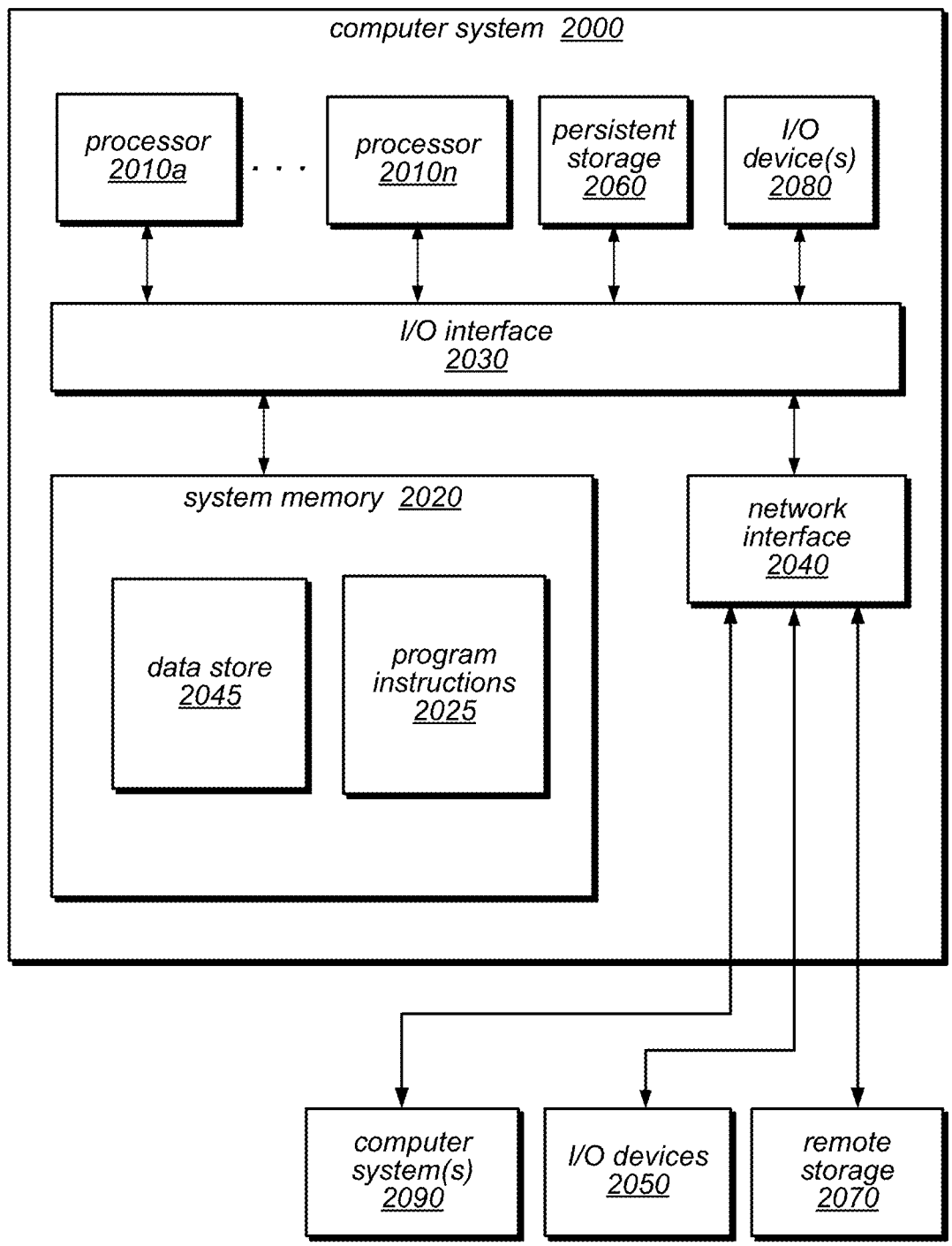
FIG. 11 is a block diagram illustrating an example computing system, according to some embodiments.

Embodiments of sharing a subnet of a logically isolated network between client accounts of a provider network as described herein may be executed on one or more computer systems, which may interact with various other devices. FIG. 11 is a block diagram illustrating an example computer system, according to various embodiments. For example, computer system 2000 may be configured to implement nodes of a provider network, such as may implement various resources, a control plane, or diagnostic agents, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the system described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a provider network, in different embodiments. In some embodiments, program instructions 2025 may implement multiple separate clients, nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more nodes, endpoints, systems, or services internal to or external to a provider network, and/or clients of the provider network described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of computing nodes, respectively comprising at least one processor and a memory, configured to implement a provider network;
wherein one or more of the computing nodes implement a control plane for the provider network, the control plane configured to:
receive a request to share a subnet of a logically isolated network created for a first client account in the provider network with a second client account in the provider network;
responsive to the request to share the subnet:
create in a graph a shared subnet object for the subnet of the logically isolated network created for the first client account, that indicates that the subnet can be shared with other clients or accounts;
store a link between an account object for the second client account and the shared subnet object in the graph;
receive a request for the second client account to host a resource in the subnet of the logically isolated network created for the first client account;
responsive to the request to host the resource:
determine that the second client account is permitted to host the resource in the subnet of the logically isolated network created for the first client account according to an evaluation of the graph that finds the link between the account object for the second client account and the shared subnet object for the subnet of the logically isolated network created for the first client account; and
perform the request to host the resource.

2. The system of claim 1, wherein the control plane is further configured to:
receive a request to stop sharing the subnet of the logically isolated network with the second client account; and
responsive to the request to stop sharing the subnet, remove the link between the account object for the second client account and the shared subnet object to stop subsequent evaluations of the graph from determining that the second client account is permitted to host resources in the subnet.

3. The system of claim 1, wherein the control plane is further configured to:
receive a request to describe the resource hosted in the subnet for the second client account from a client that is associated with the first client account; and
deny the request to describe the resource.

4. The system of claim 1, wherein the control plane is further configured to
receive a request to identify subnets available to the second client account; and
responsive to the request to identify the subnets available to the second client account, provide via an interface for the provider network an indication that the subnet is owned by the first client account and available to the first client account.

5. A method, comprising:
performing, by a provider network comprising one or more computing devices:
responsive to a request to share at least a portion of a logically isolated network created for a first client account of a provider network with a second client account of the provider network, storing a link between an account object for the second client account and a shared network object for the portion of the logically isolated network created for the first client account in a graph;

responsive to a request for the second client account to host a resource in the portion of the logically isolated network created for the first client account:

evaluating the graph to determine that the second client account is permitted to host the resource in the portion of the logically isolated network created for the first client account according to the link between the account object for the second client account and the shared network object for the portion of the logically isolated network created for the first client account; and performing the request to host the resource.

6. The method of claim 5, wherein responsive to the request to share the portion of the logically isolated network created for the first client account of a provider network with the second client account, the method further comprises creating the shared network object for the subnet of the logically isolated network in a graph.

7. The method of claim 5, wherein responsive to the request to host the resource for the second client account in the portion of the logically isolated network, the method further comprises determining that the second client account is associated with an organization that is associated with a plurality of client accounts including the first client account and the second client account.

8. The method of claim 5, further comprising:

receiving a request to describe a network security configuration for the portion of the logically isolated network associated with the first client account; and providing via an interface for the provider network the network security configuration inclusive of contributions to the network security configuration for the portion of the logically isolated network associated with the second client account.

9. The method of claim 5, further comprising:

receiving a request associated with the second client account to modify a network configuration of the portion of the logically isolated network created for the first client account; and denying the request to modify the network configuration of the portion of the logically isolated network.

10. The method of claim 5, wherein a second portion of a second logically isolated network of the provider network created for a third client account of the provider network is shared with the first client account.

11. The method of claim 10, wherein the portion of the first logically isolated network and the second portion of the second logically isolated network are respective subnets of the first logically isolated network and the second logically isolated network, and wherein the method further comprises:

receiving a request to identify subnets available to the first client account; and responsive to the request to identify the subnets available to the first client account, providing via an interface for the provider network an indication that:

the subnet of the first logically isolated network is owned by the first client account and available to the first client account; and the subnet of the second logically isolated network is owned by the third client account and available to the first client account.

12. The method of claim 5, further comprising:

receiving a request to stop sharing the portion of the logically isolated network with the second client account; and responsive to the request to stop sharing the portion of the logically isolated network, removing the link between the account object for the second client account and the shared network object to stop subsequent evaluations of the graph from determining that the second client account is permitted to host resources in the subnet.

13. The method of claim 12, wherein the request to stop sharing the portion of the logically isolated network is associated with the second client account.

14. One or more non-transitory, computer-readable storage media, storing program instructions that when executed on or across one or more computing devices cause the one or more computing devices to implement:

responsive to a request to share a subnet of a logically isolated network created for a first client account of a provider network with a second client account of the provider network, causing a link between an account object for the second client account and a shared subnet object for the subnet of the logically isolated network created for the first client account to be stored in a graph;

responsive to a request for the second client account to host a resource in the subnet of the logically isolated network created for the first client account:

causing an evaluation of the graph to determine that the second client account is permitted to host the resource in the subnet of the logically isolated network created for the first client account according to the link between the account object for the second client account and the shared subnet object for the subnet of the logically isolated network created for the first client account; and causing the resource to be hosted in the subnet.

15. The one or more non-transitory, computer-readable storage media of claim 14, wherein the program instructions cause the one or more computing devices to further implement:

responsive to a request to share a second subnet of the logically isolated network created for the first client account of the provider network with a third client account of the provider network, causing a link between an account object for the third client account and a shared subnet object for the second subnet of the logically isolated network to be stored in the graph.

16. The one or more non-transitory, computer-readable storage media of claim 14, wherein the program instructions cause the one or more computing devices to further implement:

responsive to a request to share the subnet with third second client account of the provider network, causing a link between an account object for the third client account and the shared subnet object for the subnet of the logically isolated network to be stored in a graph;

responsive to a request to host a second resource for the third client account in the subnet:

causing an evaluation of the graph to determine that the third client account is permitted to host the second resource in the subnet according to the link between the account object for the third client account and the shared subnet object; and causing the second resource to be hosted in the subnet.

17. The one or more non-transitory, computer-readable storage media of claim 14, wherein the program instructions cause the one or more computing devices to further implement:
- receiving a request associated with the first client account to describe the resource hosted in the subnet for the second client account; and
- denying the request to describe the resource.

18. The one or more non-transitory, computer-readable storage media of claim 14, wherein the program instructions cause the one or more computing devices to further implement:
- receiving a request to stop sharing the subnet of the logically isolated network with the second client account; and
- responsive to the request to stop sharing the subnet, causing the link between the account object for the second client account and the shared subnet object to be removed to stop subsequent evaluations of the graph from determining that the second client account is permitted to host resources in the subnet.

19. The one or more non-transitory, computer-readable storage media of claim 18, wherein the request to stop sharing the subnet is received from a client associated with the first client account.

20. The one or more non-transitory, computer-readable storage media of claim 14, wherein the program instructions cause the one or more computing devices to further implement:
- receiving a request to identify subnets available to the second client account; and
- responsive to the request to identify the subnets available to the second client account, providing via an interface for the provider network an indication that the subnet is owned by the first client account and available to the first client account.

* * * * *